(12) United States Patent
Breon et al.

(10) Patent No.: US 11,390,774 B2
(45) Date of Patent: Jul. 19, 2022

(54) CURABLE COATING COMPOSITIONS CONTAINING POLY ACTIVATED METHYLENE RESINS AND POLYISOCYANATES

(71) Applicant: PPG Industries Ohio, Inc., Cleveland, OH (US)

(72) Inventors: Jonathan P. Breon, Pittsburgh, PA (US); Jun Deng, Mars, PA (US); Linlin Li, Pittsburgh, PA (US); John E. Schwendeman, Wexford, PA (US); Edward R. Millero, Jr., Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 15 days.

(21) Appl. No.: 15/759,162

(22) PCT Filed: Sep. 9, 2016

(86) PCT No.: PCT/US2016/050920
§ 371 (c)(1),
(2) Date: Mar. 9, 2018

(87) PCT Pub. No.: WO2017/044726
PCT Pub. Date: Mar. 16, 2017

(65) Prior Publication Data
US 2018/0282575 A1    Oct. 4, 2018

Related U.S. Application Data

(60) Provisional application No. 62/217,295, filed on Sep. 11, 2015.

(51) Int. Cl.
| | |
|---|---|
| *C09D 175/06* | (2006.01) |
| *C09D 175/04* | (2006.01) |
| *C08L 101/00* | (2006.01) |
| *C08G 81/02* | (2006.01) |
| *C08G 18/28* | (2006.01) |
| *C08L 83/12* | (2006.01) |
| *C09D 183/06* | (2006.01) |
| *C08G 18/34* | (2006.01) |
| *C08G 18/42* | (2006.01) |
| *C08G 18/61* | (2006.01) |
| *C08G 18/62* | (2006.01) |
| *C08G 18/66* | (2006.01) |
| *C08G 18/73* | (2006.01) |
| *C09D 133/14* | (2006.01) |
| *C08G 77/46* | (2006.01) |

(52) U.S. Cl.
CPC ....... *C09D 175/06* (2013.01); *C08G 18/2895* (2013.01); *C08G 18/34* (2013.01); *C08G 18/423* (2013.01); *C08G 18/61* (2013.01); *C08G 18/6225* (2013.01); *C08G 18/6659* (2013.01); *C08G 18/73* (2013.01); *C08G 81/027* (2013.01); *C08L 83/12* (2013.01); *C08L 101/00* (2013.01); *C09D 133/14* (2013.01); *C09D 175/04* (2013.01); *C09D 183/06* (2013.01); *C08G 77/46* (2013.01)

(58) Field of Classification Search
CPC .. C09D 175/04; C09D 133/14; C09D 175/06; C09D 183/06; C08G 18/2895; C08G 18/34; C08G 18/423; C08G 18/61; C08G 18/6225; C08G 18/6659; C08G 18/73; C08G 77/46; C08G 81/027; C08L 101/00; C08L 83/12; B05D 3/002; B05D 3/007; B05D 7/14; B05D 7/536
See application file for complete search history.

(56) References Cited

U.S. PATENT DOCUMENTS

| | | | | |
|---|---|---|---|---|
| 3,068,204 | A | * 12/1962 | Edmonds | .............. C08G 63/85 528/279 |
| 4,028,313 | A | * 6/1977 | Muller | .............. C08G 18/0823 528/69 |
| 5,414,041 | A | 5/1995 | Larson et al. | |
| 5,714,563 | A | 2/1998 | DePompei et al. | |
| 5,744,550 | A | 4/1998 | Menovcik et al. | |
| 5,849,855 | A | 12/1998 | Usui et al. | |
| 5,859,135 | A | * 1/1999 | Doomen | ............ C08G 18/0823 525/123 |
| 7,459,515 | B2 | 12/2008 | Gommans et al. | |
| 8,353,651 | B2 | 1/2013 | Levandoski et al. | |
| 2003/0153676 | A1* | 8/2003 | Brinkhuis | ............. C08F 265/04 524/832 |

(Continued)

FOREIGN PATENT DOCUMENTS

| | | |
|---|---|---|
| CN | 1162609 A | 10/1997 |
| GB | 1001458 | 8/1965 |

(Continued)

OTHER PUBLICATIONS

Polymer Chemistry NPL document (Year: 2016).*

(Continued)

*Primary Examiner* — Michael B Nelson
(74) *Attorney, Agent, or Firm* — Michael J. Grese

(57) ABSTRACT

A curable coating composition includes: (a) a polymer including at least two active methylene functional groups; (b) a polyisocyanate crosslinker; and (c) a transition metal catalyst. Substrates at least partially coated with these coating compositions are further disclosed. Methods for preparing the coating are further disclosed. Multi-layer coatings including these coating compositions are further disclosed.

16 Claims, No Drawings

(56) References Cited

U.S. PATENT DOCUMENTS

| | | | |
|---|---|---|---|
| 2003/0171497 A1* | 9/2003 | Coca | C09D 123/22 525/326.2 |
| 2004/0186217 A1 | 9/2004 | Pelosi et al. | |
| 2006/0234036 A1* | 10/2006 | December | C09D 5/002 428/328 |

FOREIGN PATENT DOCUMENTS

| | | | |
|---|---|---|---|
| GB | 1263609 | | 2/1972 |
| JP | 09-279092 | * | 12/2009 |
| KR | 100478930 B1 | | 10/2005 |
| RU | 2007114046 A | | 10/2008 |
| WO | 2014025997 A1 | | 2/2014 |

OTHER PUBLICATIONS

Other Resins and Cross-Linkers NPL document (Year: 2017).*
Translated summary of JP 09-279092, retrieved Jun. 16, 2021.*
Computer generated English translation of RU2007114046.

* cited by examiner

CURABLE COATING COMPOSITIONS CONTAINING POLY ACTIVATED METHYLENE RESINS AND POLYISOCYANATES

CROSS REFERENCE TO RELATED APPLICATIONS

This application claims priority to U.S. Patent Provisional Application Ser. No. 62/217,295 filed Sep. 11, 2015, which is hereby incorporated by reference in its entirety.

FIELD OF THE INVENTION

The present invention relates to curable coating compositions based on active methylene containing resins and polyisocyanates, substrates coated with the curable coating compositions and methods of preparing the coatings.

BACKGROUND OF THE INVENTION

High-solids coatings are used in a variety of industries. Currently available decorative topcoats using polymethylene resins have been limited due to the excessive yellowing occurring during the cross-linking process. Cross-linking reactions of activated methylene compounds may be base-catalyzed addition reactions resulting in highly yellow coating compositions. In addition, currently available coatings may be made from polymethylene resins reacted with polyamines, but these reactions result in conjugated ketamine products that are highly yellow.

SUMMARY OF THE INVENTION

The present invention is directed to a curable coating composition comprising: (a) a polymer comprising at least two active methylene functional groups; (b) a polyisocyanate crosslinker; and (c) a transition metal catalyst.

The present invention is also directed to a substrate at least partially coated with a coating deposited from the curable coating composition comprising: (a) a polymer comprising at least two active methylene functional groups; (b) a polyisocyanate crosslinker; and (c) a transition metal catalyst.

The present invention is also directed to a multi-layer coating comprising: (a) a first coating layer prepared from a curable coating composition comprising: (i) a polymer comprising at least two active methylene functional groups; (ii) a polyisocyanate crosslinker; and (iii) a transition metal catalyst; and (b) a second coating layer, the second coating layer prepared from a coating composition that is different from (a) and which comprises a second film-forming resin.

The present invention is also directed to a method for preparing a coating comprising: (i) applying the curable coating composition comprising: (a) a polymer comprising at least two active methylene functional groups; (b) a polyisocyanate crosslinker; and (c) a transition metal catalyst onto at least a portion of a substrate; and (ii) curing the curable coating composition at at least 20° C. for less than 4 hours to form a coating on the substrate.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" film-forming resin, "an" aliphatic polyisocyanate, "a" transition metal complex catalyst, and the like refer to one or more of any of these items. Also, as used herein, the term "polymer" is meant to refer to prepolymers, oligomers and both homopolymers and copolymers. The term "resin" is used interchangeably with "polymer."

In one aspect, the present invention is directed to a curable coating composition including a film-forming resin (a polymer) comprising at least two active methylene functional groups; a polyisocyanate crosslinker; and a transition metal catalyst. As used herein, a "film-forming resin" refers to a resin that can form a self-supporting continuous film on at least a horizontal surface of a substrate upon removal of any diluents or carriers present in the composition or upon curing. The film-forming resin can include any of a variety of thermoplastic and/or thermosetting film-forming resins known in the art. As used herein, the term "thermosetting" refers to resins that "set" irreversibly upon curing or cross-linking, wherein the polymer chains of the polymeric components are joined together by covalent bonds. This property is usually associated with a cross-linking reaction of the composition constituents often induced, for example, by heat or radiation. Curing or crosslinking reactions also may be carried out under ambient conditions or at low temperatures. Once cured or crosslinked, a thermosetting resin will not melt upon the application of heat and is insoluble in solvents. As noted, the film-forming resin comprising at least two active methylene functional groups can also include a thermoplastic film-forming resin. As used herein, the term "thermoplastic" refers to resins that include polymeric components that are not joined by covalent bonds and thereby can undergo liquid flow upon heating and are soluble in solvents.

Non-limiting examples of suitable film-forming resins having at least two active methylene functional groups include (meth)acrylic resins. As used herein, "(meth)acrylic" and like terms refer both to the acrylic and the corresponding methacrylic. Other non-limiting examples of suitable film-forming resins having at least two active methylene functional groups include polyurethanes, polyureas, polyesters, polyamides, polyethers, polysiloxanes, epoxy resins, vinyl resins, polyolefins copolymers thereof, and mixtures thereof. Appropriate mixtures of film-forming resins may also be used in the preparation of the present curable coating compositions.

The film-forming resin comprising at least two active methylene functional groups can have any of a variety of additional reactive functional groups including, but not limited to, carboxylic acid groups, epoxide groups, hydroxyl groups, thiol groups, isocyanate groups (including blocked isocyanate groups), anhydride groups, alkoxysilane groups, aziridine groups, carbodiimide groups, and combinations thereof. The term "reactive functional group" refers to an atom, group of atoms, functionality, or group having sufficient reactivity to form at least one covalent bond with another reactive group in a chemical reaction.

Non-limiting examples of suitable film-forming resins include film-forming resins comprising at least two active methylene functional groups and a methylene equivalent weight of from 150 to 1000. As used herein, an "active methylene-reactive functional group" refers to a methylene or methanediyl $CH_2$ group having a structure as follows:

where X and Y are the same or different electron withdrawing groups including carbonyl, ester, ketone, amide, nitrile, or nitro groups. Other non-limiting examples of suitable film-forming resins having at least two active methylene functional groups include film-forming resins having acetoacetate functional groups, malonate functional groups, and combinations thereof. Non-limiting examples of suitable film-forming resins having at least two active methylene functional groups comprise polyacetoacetate-containing polyesters, polyacetoacetate-containing polyacrylate, and/or mixtures thereof. It is understood that mixtures of various compounds comprising at least two active methylene functional groups can be used in the curable coating composition. Non-limiting examples of suitable film-forming resins having at least two active methylene functional groups include polyacetoacetate-containing polyacrylates having less than 85 weight %, less than 80 weight %, less than 75 weight %, less than 70 weight %, less than 60 weight %, less than 50 weight %, less than 25 weight %, or less than 15 weight % of monomers having a glass transition temperature (Tg) of less than −40° C., less than −30° C., less than −20° C., less than −10° C., less than 0° C., or less than 10° C. Tg is determined using differential scanning calorimetry.

The film-forming resins having at least two active methylene functional groups can comprise a methylene equivalent weight of from 150 to 1,000. The optional additional film-forming resins having at least two active methylene functional groups can comprise a methylene equivalent weight of less than 150. As used herein, "methylene equivalent weight" refers to a ratio of the number average molecular weight to the number of methylene groups in the polymer.

The film-forming resin having at least two active methylene functional groups and a methylene equivalent weight of from 150 to 1,000 can have a weight average molecular weight (Mw) of at least 1,000 g/mol, at least 1,500 g/mol, at least 2,000 g/mol, or at least 2,500 g/mol, as determined by gel permeation chromatography versus a polystyrene standard.

The film-forming resin having at least two active methylene functional groups can have a number average molecular weight (Mn) of at least 1,000 g/mol, at least 1,500 g/mol, at least 2,000 g/mol, or at least 2,500 g/mol, as determined by gel permeation chromatography versus a polystyrene standard.

The additional optional film-forming resin having at least two active methylene functional groups can have a number average molecular weight (Mn) less than 1,000 g/mol, or less than 750 g/mol, or less than 500 g/mol, as determined by gel permeation chromatography versus a polystyrene standard.

The film-forming resins having at least two active methylene functional groups can be such that the active methylene functional group-containing monomer of the film-forming resin has a pKa in a range such as from 9 to 14.

The film-forming resin comprising at least two active methylene functional groups can comprise at least 1 weight %, at least 5 weight %, or at least 10 weight %, based on the total weight of the reactants. The film-forming resin comprising at least two active methylene functional groups can comprise up to 90 weight %, up to 70 weight %, or up to 60 weight %, based on the total weight of the reactants. The film-forming resin comprising at least two active methylene functional groups can comprise a range such as from 1 weight % to 90 weight %, or from 5 weight % to 70 weight %, or from 10 weight % to 60 weight %, based on the total weight of the reactants.

The polyisocyanate crosslinker can be an aliphatic polyisocyanate crosslinker comprising at least two isocyanate functional groups. As used herein, an "aliphatic polyisocyanate" refers to aliphatic isocyanate functional molecules having two or more isocyanate groups. It is understood that mixtures of various polyisocyanates can be used. The aliphatic polyisocyanates can be cyclic, linear, branched, and combinations thereof. The aliphatic polyisocyanates can have a weight average molecular weight of less than 5,000 g/mol, less than 2,000 g/mol, or less than 1,000 g/mol, as determined by gel permeation chromatography versus a polystyrene standard. Non-limiting examples of suitable aliphatic polyisocyanates include polyisocyantes of isophorone diisocyanate, ethylene diisocyanate, trimethylene diisocyanate, 1,6-hexamethylenediisocyanate, 2,2,4-trimethylhexamethylene diisocyanate, 2,4,4-trimethylhexamethylene diisocyanate, bis(4-isocyanotocyclohexyl)methane, tetramethylene diisocyanate, hexamethylene diisocyanate, octamethylene diisocyanate, nonamethylene diisocyanate, decamethylene diisocyanate, 1,6,11-undecane-triisocyanate, 1,3,6-hexamethylene triisocyanate, trimethylhexane diisocyanate, trimethylhexamethylene diisocyanate, 2,2'-dimethylpentane diisocyanate, 2,2,4-trimethylhexane diisocyanate, 2,4,4-trimethylhexamethylene diisocyanate, 1,8-diisocyanato-4-(isocyanatomethyl)octane, 2,5,7-trimethyl-1,8-diisocyanato-5-(isocyanatomethyl)octane, 1,4-cyclohexyl diisocyanate, 4,4'-dicyclohexylmethane diisocyanate, 3-isocyanato methyl-3,5,5-trimethyl cyclohexyl isocyanate, cyclohexane diisocyanate, methylcyclohexane diisocyanate, bis(isocyanatomethyl) cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-

(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanato-methyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo-[2.2.1]-heptane, 2-isocyanatomethyl-2-(3-isocyanatopropyl)-6-(2-isocyanatoethyl)-bicyclo[2.2.1]-heptane, dimers, trimers, isocyanurates, iminooxadiazindiones, biurets, allophanates, uretdiones, and/or mixtures thereof. The total amount of polyisocyanate(s) can comprise at least 1 weight %, at least 5 weight %, at least 10 weight %, based on the total weight of the reactants. The total amount of polyisocyanate(s) can also comprise up to 60 weight %, up to 50 weight %, up to 40 weight %, based on the total weight of the reactants. The total amount of polyisocyanate(s) can comprise a range such as from 1 to 60 weight %, from 5 to 50 weight %, from 10 to 40 weight %, based on the total weight of the reactants.

The film-forming resin comprising at least two active methylene functional groups and the aliphatic polyisocyanate crosslinker can be used at various ratios in the curable coating composition according to the present invention. The ratio of isocyanate functional groups to methylene functional groups can be in a range such as from 2.5:1 to 0.5:1 or 2.5:1 to 0.9:1.

The curable coating composition according to the present invention can also include a transition metal complex. As used herein, a "transition metal complex" refers to a coordination complex including at least one transition metal atom or ion. The transition metal or ion can be bonded via coordination bonds, ionic bonds, and/or covalent bonds to one or more surrounding ligands. As used herein, a "ligand" refers to a compound, molecule, or ion capable of forming a coordination bond, ionic bond, and/or covalent bond with a transition metal. The term "ligand" is used interchangeably with "complexing agent."

Non-limiting examples of suitable transition metal complexes include Group 9, Group 10, Group 11, or Group 12 (International Union of Pure and Applied Chemistry (IUPAC)) complexes. Examples of suitable transition metal complexes can include zinc complexes, nickel complexes, cobalt complexes, and/or copper complexes. Non-limiting examples of suitable transition metal complexes include chelating, non-chelating, monodentate, and/or polydentate ligands. The ligands can be bonded to the transition metal atom or ion of the transition metal complex via one or more atoms. The one or more atoms of the neutral or charged ligands or complexing agents can include, but are not limited to, oxygen, nitrogen, silicon, boron, sulfur, phosphorous, carbon, and/or halide. Non-limiting examples of suitable ligands include halide, inorganic salts, organic compounds, and/or organic salts. Examples of ligands or complexing agents can include, but are not limited to, fluoride, chloride, bromide, iodide, cyanide, cyanate, isocyanate, thiocyanate, isothiocyanate, nitrate, nitrite, phosphate, triflate, fluoroborate, bisulfate, sulfate, azide, hydroxide, oxalate, water, ammonia, acetonitrile, dithiophosphate, dibutyldithiocarbamate, methacrylate, octoate, malonate, methanolate, ethanolate, propanolate, isopropanolate, tert-butylate, phenolate, benzoate, stearate, ethylhexoate, acetate, oxalate, lactate, malate, fumarate, salen, ethylenediamine, tetramethylethylenediamine, propylenediamine, pyridine, 2,2'-bipyridine, o-phenanthroline, diphosphines, such as, for example, bis(diphenylphosphino)methane, bis(diphenylphosphino)ethane, bis(diphenylphosphino)propane, bis(diphenylphosphino)butane, bis(dimethylphosphino)methane, bis(dimethylphosphino)ethane, bis(dimethylphosphino)propane, bis(diethylphosphino)methane, bis(diethylphosphino)ethane, bis(diethylphosphino)propane, bis(di-tert-butylphosphino)methane, bis(di-tert-butylphosphino)ethane, bis(tert-butylphosphino)propane, acetylacetone, benzoylacetone, 1,5-diphenylacetylacetone, dibenzoylmethane, bis(1,1,1-trifluoroacetyl)methane, ethyl acetoacetate, pyridine-2-carboxylic acid, quinoline-2-carboxylic acid, glycine, N,N-dimethylglycine, alanine, N,N-dimethylaminoalanine, methylsalicylimine, ethylsalicylimine, phenylsalicylimine, ethylene glycol, 1,3-propylene glycol, 1,2-ethylenedithiol, 1,3-propylenedithiol, corresponding acids, bases, salts, and/or any combination thereof.

The transition metal complex according to the present invention can act as a catalyst and can provide reduced activity at ambient temperature and enhanced activity at elevated temperatures. The transition metal complex is not incorporated into the coating composition of the present invention and thus is not a "curing agent" or "crosslinking agent" or other similar species that is a reactant used to form the coating composition.

The curable coating composition can further comprise an additional catalyst referred to as a "co-catalyst." As used herein, the "co-catalyst" refers to a compound that is different from the Group 9, Group 10, Group 11, or Group 12 (International Union of Pure and Applied Chemistry (IUPAC)) transition metal complex.

The curable coating composition can further comprise one or more additional film-forming resins. The additional film-forming resins can be selected from, for example, polyaspartic esters, polyurethanes, acrylic polymers, polyester polymers, polyamide polymers, polyether polymers, polysiloxane polymers, polyepoxy polymers, epoxy resins, vinyl resins, polyolefin polymers, polyanhydride polymers, polyaziridines, polycarbodiimides copolymers thereof, and mixtures thereof. Thermosetting or curable coating compositions typically comprise film-forming resins having functional groups. The additional film-forming resin can have any of a variety of reactive functional groups including, but not limited to, ethylenically unsaturated groups such as (meth)acrylate groups and allyl groups, carboxylic acid groups, amine groups, epoxide groups, hydroxyl groups, thiol groups, isocyanate groups (including blocked isocyanate groups), carbodiimide groups, aziridine groups, anhydride groups, alkoxysilane groups, and combinations thereof. The additional film-forming resin can comprise a functionality (quantity of functional groups) of at least 1, such as a functionality of 2 or more, 3 or more, 4 or more, 5 or more, or 6 or more, and up to 30, or up to 20, or up to 10. For example, the additional film-forming resin can include 6 or more ethylenically unsaturated groups, such as 6 or more (meth)acrylate groups. The additional film-forming resin can comprise isocyanate-reactive functional groups. Such resins comprising isocyanate-reactive functional groups can comprise resins that are not reactive with the active methylene groups of the film-forming resins comprising at least two active methylene functional groups. The additional film-forming resin can be used to adjust certain properties in the final coating including, but not limited to, increased mechanical and/or chemical resistance. Appropriate mixtures of film-forming resins may also be used in the preparation of the present coating compositions.

The curable coating composition can further comprise a resin comprising activated methylene-reactive functional groups. As used herein, an "activated methylene-reactive functional group" refers to a group having a structure as follows: X—CH$_2$—Y, where X and Y are the same or different electron withdrawing groups including ester, ketone, amide, nitrile, or nitro groups.

The curable coating composition can exhibit less than 100% increase in viscosity after 30 days at 140° F. As used herein, a "100% increase in viscosity" refers to a doubling of the viscosity in the absence of either the transition metal complex catalyst or polyisocyanate.

The curable coating composition according to the present invention can be such that, when formed into a cured coating, the curable coating composition exhibits a color change of no more than 3 ΔE units when compared to an uncured coating. As used herein, "angle dependent color change of no more than 3 ΔE units" means that the color difference of two coatings being compared does not exceed 3 ΔE units at any viewing angle when measured within the range of viewing angles from 110° to −15° using a multi-angle spectrophotometer, such as an MA68I Multi-angle spectrophotometer, commercially available from X-Rite Instruments, Inc. The curable coating composition according to the present invention can be such that, when formed into a cured coating, the curable coating composition exhibits a color change of no more than 3 ΔE units after 1,000 hours of accelerated weathering testing according to SAE J2527.

The coating composition according to the present invention can be such that when formed into a cured coating, the difference in the b* between the cured coating and the coating composition without transition metal catalyst is less than 1. This is based on the lab color space where yellow-blue colors are represented along the b* axis. Color can be measured using an X-Rite ci7800 benchtop spectrophotometer to measure the yellowness (b*).

The present invention is also directed to a substrate at least partially coated with a coating prepared from any of the curable coating compositions previously described, such as a curable composition comprising a film-forming resin having at least two active methylene functional groups, a polyisocyanate crosslinker, and a transition metal complex catalyst. In non-limiting examples, the curable coating composition can be applied directly to the substrate as a monocoat. As used herein, a "monocoat" refers to a single layer coating system that is free of additional coating layers. Thus, the curable coating composition of the present invention can be applied directly to a substrate and cured to form a single layer coating, i.e., a monocoat.

As indicated, the present invention is also directed to a method for preparing a coating comprising mixing the elements of one of the previously described coating compositions to produce a reaction mixture. The method further comprises applying at least one layer of the reaction mixture onto at least a portion of a substrate; and curing the layer at a temperature of less than or equal to 100° C., or less than or equal to 75° C., or less than or equal to 50° C., at at least 20° C., or at ambient temperature, for less than four hours, or less than three hours, or less than two hours, or less than one hour, to form a coating on the substrate.

The curable coating composition according to the present invention can further include one or more pigment. As used herein, "pigment" refers to an inorganic or organic material which is capable of materially contributing to the opacity or hiding capability of a coating but not catalyze the reactions described herein, such as the reaction between (a) a polymer comprising at least two active methylene functional groups and (b) a polyisocyanate crosslinker. Non-limiting examples of suitable pigments include titanium dioxide, zinc oxide, barium sulfate, calcium carbonate, talc, carbon black, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), phthalo green or blue, iron oxide, bismuth vanadate, anthraquinone, perylene, and quinacridone, and mixtures thereof. The pigment can be added to the curable coating composition in any suitable form, such as discrete particles, dispersions, solutions, and/or flakes. The pigment can also be incorporated into the coatings by use of a grind vehicle, such as an acrylic grind vehicle, the use of which will be familiar to one skilled in the art.

The curable coating composition according to the present invention can further include one or more corrosion inhibiting pigment. As used herein, "corrosion inhibiting pigment" refers to an organic or inorganic material, substance, compound, complex, or component that reduces the rate or severity of corrosion of a surface on a metal or metal alloy substrate but not catalyze the reactions described herein, such as the reaction between (a) a polymer comprising at least two active methylene functional groups and (b) a polyisocyanate crosslinker. The corrosion inhibitor can include an inorganic alkali, alkaline earth, or transition metal compound. As used herein, the term "alkali metal" refers to an element in Group 1 (IUPAC) of the periodic table of the chemical elements, and includes, e.g., cesium, francium, lithium, potassium, rubidium, and sodium. The term "alkaline earth metal" refers to an element of Group 2 (IUPAC) of the periodic table of the chemical elements, and includes, e.g., barium, beryllium, calcium, magnesium, and strontium. Non-limiting examples of transition metal compounds include compounds of zinc, scandium, yttrium, titanium, zirconium, vanadium, molybdenum, tungsten, chromium, manganese, iron, aluminum, lead, cerium, praseodymium, neodymium, and combinations thereof.

Non-limiting examples of inorganic alkali, alkaline earth, or transition metal compounds include alkali, alkaline earth, or transition metal hydroxides; alkali, alkaline earth, or transition metal oxides; alkali, alkaline earth, or transition metal iodides; alkali, alkaline earth, or transition metal phosphides; alkali, alkaline earth, or transition metal phosphates; alkali, alkaline earth, or transition metal polyphosphates; alkali, alkaline earth, or transition metal sulfates; alkali, alkaline earth, or transition metal sulfides; alkali, alkaline earth, or transition metal chlorides; alkali, alkaline earth, or transition metal bromides; alkali, alkaline earth, or transition metal fluorides; alkali, alkaline earth, or transition metal nitrates; alkali, alkaline earth, or transition metal borates; alkali, alkaline earth, or transition metal silicates; alkali, alkaline earth, or transition metal cyanamides; alkali, alkaline earth, or transition metal carbonates; alkali, alkaline earth, or transition metal bicarbonates; alkali, alkaline earth, or transition metal oxalates; alkali, alkaline earth, or transition metal carboxylates; and combinations thereof. Specific non-limiting examples of inorganic alkali, alkaline earth, and/or transition metal compounds include magnesium oxide, magnesium hydroxide, magnesium carbonate, magnesium silicate, calcium oxide, calcium hydroxide, calcium carbonate, calcium phosphate, calcium silicate, zinc phosphate, aluminum phosphate, magnesium phosphate, yttrium phosphate, bismuth phosphate, lead phosphate, lead phosphate, zinc-5-nitroisophthalate, molybdenum phosphate, zinc-5-nitroisophthalate, organic-modified zinc aluminum molybdenum phosphate hydrate, and combinations thereof. Other suitable corrosion inhibitors also include benzotriazole, 5-methyl benzotriazole, 2-aminothiazole, and their derivatives, or combinations of any of the foregoing.

The film-forming resin having at least two active methylene functional groups, aliphatic polyisocyanate crosslinker, transition metal complex catalyst, pigment, corrosion inhibitor, and any other additional materials can all be mixed together in a liquid medium for application to a substrate. The liquid medium can include a non-aqueous liquid medium. As used herein, the term "non-aqueous" refers to a liquid medium comprising less than 50 weight % water, based on the total weight of the liquid medium. In accordance with the present invention, such non-aqueous liquid media can comprise less than 40 weight % water, or less than 30 weight % water, or less than 20 weight % water, or less than 10 weight % water, or less than 5 weight % water, based on the total weight of the liquid medium. The solvents that make up at least 50 weight % of the liquid medium include organic solvents. Non-limiting examples of suitable organic solvents include glycols, glycol ether alcohols, alcohols, ketones, glycol diethers, esters, and diesters. Other non-limiting examples of organic solvents include aromatic and aliphatic hydrocarbons.

The curable coating composition according to the present invention can have a total VOC of 420 g/l or less, of 333 g/l or less, of 300 g/l or less, or of 250 g/l or less. As used herein, a "VOC" is defined as a Volatile Organic Compound according to the United States Environmental Protection Agency.

After mixing the film-forming resin having at least two active methylene functional groups, polyisocyanate crosslinker, transition metal complex catalyst, optional inorganic pigment together, and any other optional material in a liquid medium, the mixture can be applied to a wide range of substrates known in the coatings industry. For example, the curable coating composition of the present invention can be applied to automotive substrates, industrial substrates, aircraft and aircraft components, packaging substrates, wood flooring and furniture, apparel, electronics, including housings and circuit boards, glass and transparencies, sports equipment, including golf balls, and the like. These substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. The metallic substrates can also further comprise a metal pretreatment coating or conversion coating. Examples of suitable pretreatment coatings or conversion coatings include, but are not limited to, zinc phosphate, iron, phosphate, or chromate-containing pretreatments. Other examples of suitable pretreatment coatings or conversion coatings include, but are not limited to, thin-film pretreatment coatings such as a zirconium or titanium-containing pretreatment. The metal pretreatment coating can also include a sealer, such as a chromate or non-chromate sealer. Non-metallic substrates may be polymeric including plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylonitrile butadiene styrene (PC/ABS), polyamide, or may be wood, veneer, wood composite, particle board, medium density fiberboard, cement, stone, glass, paper, cardboard, textiles, leather, both synthetic and natural, and the like. Non-metallic substrates may also include a treatment coating that is applied before application of the coating, which increases the adhesion of the coating to the substrate.

The curable coating compositions of the present invention are particularly useful when applied to metallic substrates or pretreated metallic substrates. For example, the coatings of the present invention are particularly beneficial when applied to steel or aluminum substrates, such as substrates used in agricultural, construction, or transportation equipment.

The curable coating compositions described herein can be applied by any means standard in the art, such as electrocoating, spraying, electrostatic spraying, dipping, rolling, brushing, and the like. After the curable coating compositions are applied to a substrate, the compositions can be dried or cured at ambient conditions or with heat. As used herein, "ambient conditions" refers to the conditions of the surrounding environment (e.g., the temperature, humidity, and pressure of the room or outdoor environment in which the substrate is located). The coatings formed from the curable coating composition can be applied to a dry film thickness of 10 micron to 100 microns, 15 micron to 70 microns, or 20 microns to 40 microns.

As indicated, the present invention is also directed to a multi-layer coating comprising a first coating layer prepared from one of the curable coating compositions previously described; and a second coating layer applied over the first coating layer, the second coating layer prepared from a coating composition that is different from the coating composition of the first coating layer and comprising a second film-forming resin.

As indicated, a second coating layer can be applied over the coating formed from the curable coating composition according to the present invention, which acts as a first coating layer. The second coating layer can be applied directly over the first coating layer without any material positioned in between. The second coating layer can be formed from a composition that includes a film-forming resin. The film-forming resin of the second coating layer can include any one or a combination of the other film-forming resins described above. For example, the film-forming resin of the second coating layer can include an epoxy or polyurethane resin. The film-forming resin used to prepare the second coating layer can be the same as or different from the film-forming resin used to prepare the curable coating composition according to the present invention, which acts a first coating layer.

Alternatively, the curable coating composition according to the present invention may serve as a topcoat layer by applying the curable coating composition over a second coating layer. The curable coating composition according to the present invention can be applied directly over the second coating layer without any material positioned in between. The second coating layer can be formed from a composition that includes a film-forming resin. The film-forming resin of the second coating layer can include any one or a combination of film-forming resins described above. For example, the film-forming resin of the second coating layer can include an epoxy or polyurethane resin. The film-forming resin used to prepare the second coating layer can be the same as or different from the film-forming resin used to prepare the curable coating composition, which acts a topcoat layer.

Alternatively, a multi-layer coating can comprise a first coating layer; and a second coating layer applied over the first coating layer, wherein the first and the second coating layers are prepared from the curable coating composition according to the present invention.

The first and second coating layers can also be applied using any of the methods previously described, such as electrocoating, spraying, electrostatic spraying, dipping, rolling, brushing, and the like. Each curable coating composition can be applied as a dry-on-dry process where each curable coating composition is dried or cured prior to application of another composition. Alternatively, all or certain combinations of each curable coating composition described herein can be applied as a wet-on-wet process and dried or cured together.

Additional coating layers can also be added to the multi-layer coating previously described. For instance, the multi-layer coating can also include a third coating layer formed over the second coating layer or the topcoat layer. The third coating layer can be formed from a curable coating composition that includes a film-forming resin and pigments such as inorganic pigment particles, for example. The film-forming resin and colorant can include any of the resins and pigments previously described. For example, the third coating composition can include black pigment particles to form a black outer coating over the second coating layer.

The multi-layer coating can also include a clear coating layer. As used herein, a "clear coating layer" refers to a coating layer that is transparent. The term "transparent" refers to a coating wherein a surface beyond the coating is visible to the naked eye when viewed through the coating. The clear coating layer can be formed from a curable coating composition that can include any of the film forming resins previously described. The curable coating composition can also include any of the pigments previously described. Such pigments can be added in a manner that does not interfere with the desired transparency of the clear coating layer.

Any of the curable coating compositions described herein can include additional materials. Non-limiting examples of additional materials that can be used with the curable coating compositions of the present invention include plasticizers, abrasion resistant particles, corrosion resistant particles, corrosion inhibiting additives, fillers including, but not limited to, clays, inorganic minerals, anti-oxidants, hindered amine light stabilizers, UV light absorbers and stabilizers, surfactants, flow and surface control agents, thixotropic agents, organic cosolvents, reactive diluents, catalysts, reaction inhibitors, and other customary auxiliaries.

The following examples are presented to demonstrate the general principles of the invention. The invention should not be considered as limited to the specific examples presented. All parts and percentages in the examples are by weight unless otherwise indicated.

Example 1

Evaluation of Different Catalysts in a Curable Coating Composition

A curable coating composition according to the present invention was prepared from the components listed in Table 1.

TABLE 1

| Base Component | Weight (grams) |
| --- | --- |
| Acetoacetate polyester resin[1] | 25.40 |
| Polyisocyanate[2] | 31.75 |
| Butyl acetate | 34.91 |

[1]Acetoacetate polyester including 1,4-cyclohexane diacid, isophthalic acid, ethylene glycol, neopentyl glycol, 1,4-cyclohexanedimethanol, trimethylol propane, and tert-butyl acetoacetate. Mn = 681, Mw = 1151.
[2]Polyisocyanate based on hexamethylene diisocyanate (80%) dissolved in butyl acetate and SOLVESSO ™ 100 (naphtha solvent commercially available from ExxonMobil Corp. (Irving, Texas)).

The catalysts shown in Table 2 were each separately tested in a curable coating composition as described in Table 1. Each catalyst of Table 2, the acetoacetate polyester resin, and butyl acetate were combined and mixed until the catalyst was dissolved. The polyisocyanate was added to each coating, again mixed thoroughly, and then drawn down on a cold-rolled steel panel using a size 40 coil-bar using according to ASTM D-4147-99. The gel time (time required for the curable composition to gel) and dry time (cure) were noted. The pendulum hardness was measured after 48 hrs.

TABLE 2

| Catalyst | Amount (g) | Gel Time (min) | Dry Time (min) | Pendulum Hardness[6] @ 48 hrs. (Konig, sec.) | Color Change/ Observations |
| --- | --- | --- | --- | --- | --- |
| None | — | greater than 3 months | N/A | N/A | None; no reaction when heated at 100° C. for 30 minutes, significant yellowing is observed with no gel |
| 1,8-Diazabicyclo[5.4.0]undec-7-ene | 0.43 | 45 | 60 | 28 | Severe yellowing upon addition of catalyst |
| 22% Zinc HEX-CEM ®[3] | 1 | 75 | 55 | 36 | None/minimal |
| Zinc chloride | 0.47 | 6 hrs. | 6 hrs. | 61 | None/minimal |
| Zinc triflate | 1.22 | 65 | 60 | 60 | None/minimal |
| Butyl ZIMATE ®[4] | 1.57 | >>48 hrs. | <24 hrs. | 44 | None (hazy; catalyst demonstrated limited solubility) |

TABLE 2-continued

| Catalyst | Amount (g) | Gel Time (min) | Dry Time (min) | Pendulum Hardness[6] @ 48 hrs. (Konig, sec.) | Color Change/ Observations |
|---|---|---|---|---|---|
| HITEC ® 7197G[5] | 2 | <24 hrs. | <24 hrs. | 41 | None/minimal |
| Nickel octoate | 1.69 | 20 | 50 | 163 | Green due to the color of catalyst; no additional color change observed upon curing |

[3] Zinc octoate available from OM Group Incorporated (Cleveland, OH).
[4] Zinc dibutyldithiocarbamate available from Vanderbilt Chemicals, LLC (Norwalk, CT).
[5] Zinc dialkyl dithiophosphate available from Afton Chemical Corporation (Richmond, VA).
[6] Hardness of a coating tested in accordance with ASTM D 4366.

Examples 2-14

Preparation of Curable Coating Compositions

Curable coating compositions according to the present invention were prepared from the components listed in Tables 3 and 4.

TABLE 3

| Components | Ex. 2 | Ex. 3 | Ex. 4 | Ex. 5 | Ex. 6 | Ex. 7 | Ex. 8 |
|---|---|---|---|---|---|---|---|
| | | | | Weight (grams) | | | |
| Stage 1 | | | | | | | |
| K-FLEX ® 7301 [7] | 16.16 | 0 | 0 | 0 | 0 | 0 | 0 |
| Acetoacetate polyester resin [1] | 0 | 0 | 16.77 | 16.76 | 16.33 | 16.71 | 16.77 |
| Acetoacetate polysiloxane [8] | 0 | 15.46 | 0 | 0 | 0 | 0 | 0 |
| Butyl acetate | 4.22 | 5.88 | 4.22 | 4.22 | 4.11 | 4.2 | 4.22 |
| Methyl amyl ketone | 2.32 | 3.24 | 2.34 | 2.34 | 2.88 | 2.34 | 2.34 |
| DISPERBYK ®-110 [9] | 0.98 | 0.99 | 0.94 | 0.94 | 0.91 | 0.93 | 0.94 |
| TIONA ® 595 [10] | 30.66 | 32.34 | 30.13 | 30.12 | 29.34 | 30.02 | 30.14 |
| HEUCOPHOS ® ZP-10 [11] | 2.44 | 2.48 | 2.34 | 2.34 | 2.28 | 2.34 | 2.34 |
| Stage 2 | | | | | | | |
| Acetoacetate polyester resin [1] | 0 | 10.93 | 2.92 | 0.52 | 1.81 | 1.99 | 0.97 |
| Polyester polyol[12] | 0 | 0 | 0 | 0 | 0 | 0 | 5.27 |
| Butyl acetate | 0 | 0 | 1.1 | 0.71 | 0.41 | 6.28 | 0.93 |
| Methyl amyl ketone | 0 | 0 | 0.31 | 0.12 | 0 | 1.79 | 0.23 |
| Polybutylacrylate | 0.49 | 0.50 | 0.47 | 0.47 | 0.46 | 0.47 | 0.47 |
| BYK ®-3455 [13] | 0.15 | 0 | 0.14 | 0.14 | 0.14 | 0.14 | 0.14 |
| 8% Zinc HEX-CEM ® [14] | 0.91 | 0.74 | 1.17 | 1.17 | 1.14 | 1.17 | 1.17 |
| CYASORB ® L143-50X [15] | 0 | 0 | 2.81 | 2.81 | 2.74 | 2.8 | 2.81 |
| TINUVIN ® 123 [16] | 0.98 | 0.99 | 0 | 0 | 0 | 0 | 0 |
| TINUVIN ® 1130 [17] | 0.49 | 0.5 | 0 | 0 | 0 | 0 | 0 |
| Acetone | 2.8 | 3.14 | 3.54 | 3.56 | 2.31 | 3.36 | 3.54 |
| Methyl acetate | 0 | 0 | 0 | 0 | 0 | 0 | 0 |
| Stage 3 | | | | | | | |
| Polyisocyanate [2] | 37.42 | 22.81 | 30.8 | 33.79 | 0 | 0 | 27.71 |
| Aliphatic diisocyanate mixture [18] | 0 | 0 | 0 | 0 | 35.75 | 0 | 0 |

[7] Acetoacetoxy-functionalized polymer available from King Industries, Inc. (Norwalk, CT).
[8] Acetoacetate polysiloxane polyether prepared according to Example 7 of U.S. Pat. No. 5,952,443. Mn = 2733, Mw = 5723
[9] Dispersing agent available from Altana AG (Wesel, Germany).
[10] Titanium dioxide available from Cristal (Jeddah, Saudi Arabia).
[11] Zinc Phosphate available from Heubach GmbH (Langelsheim, Germany).
[12] Polyester polyol prepared according to Example 2 of U.S. Pat. Pub. No. 2015/0105518 A1.
[13] Polyether-modified polydimethylsiloxane available from Altana AG (Wesel, Germany).
[14] Zinc octoate available from OM Group Incorporated (Cleveland, OH).
[15] Stabilizer available from Cytec Industries Inc. (Woodland Park, NJ).
[16] Light stabilizer available from BASF Corporation (Florham Park, NJ).
[17] UV absorber available from BASF Corporation (Florham Park, NJ).
[18] Aliphatic polyisocyanate based on isophorone diisocyanate (41%), hexamethylene diisocyanate (41.3%) dissolved in methyl n-amyl ketone (13.2%) and n-butyl acetate (4.5%).
[19] Aliphatic polyisocyanate based on hexamethylene diisocyanate available from Bayer MaterialScience (Leverkusen, Germany).

TABLE 4

| Components | Ex. 9 | Ex. 10 | Ex. 11 | Ex. 12 | Ex. 13 | Ex. 14 |
|---|---|---|---|---|---|---|
| | | | Weight (grams) | | | |
| Stage 1 | | | | | | |
| Acetoacetate polyester resin [20] | 21.39 | 0 | 0 | 0 | 0 | 0 |
| Acetoacetate acrylic polymer [21] | 0 | 35.8 | 0 | 0 | 0 | 0 |
| Acetoacetate-polyol acrylic polymer [22] | 0 | 0 | 34.33 | 0 | 0 | 0 |
| Acetoacetate urethane polymer [23] | 0 | 0 | 0 | 37.34 | 0 | 0 |
| Acetoacetate polysiloxane [8] | 0 | 0 | 0 | 0 | 12.22 | 12.13 |
| Butyl acetate | 5.56 | 4.96 | 5.83 | 6.24 | 5.61 | 5.57 |
| Methyl amyl ketone | 3.09 | 2.75 | 3.24 | 3.47 | 3.09 | 3.07 |
| Ethyl 3-ethoxypropionate | 0 | 3.87 | 3.89 | 0 | 0 | 0 |
| DISPERBYK®-110 [9] | 0.94 | 0.77 | 0.78 | 0.84 | 0.95 | 0.94 |
| TIONA® 595 [10] | 30.09 | 24.33 | 24.33 | 23.92 | 30.88 | 30.63 |
| HEUCOPHOS® ZP-10 [11] | 2.34 | 1.94 | 1.95 | 2.11 | 2.37 | 2.35 |
| Stage 2 | | | | | | |
| Acetoacetate polysiloxane [8] | 0 | 0 | 0 | 0 | 12.22 | 0 |
| DESMOPHEN® NH 1420 [24] | 0 | 0 | 0 | 0 | 0 | 12.93 |
| Polybutylacrylate | 0.47 | 0.39 | 0.93 | 0.42 | 0.47 | 0.47 |
| BYK®-3455 [13] | 0.14 | 0.12 | 0.12 | 0.13 | 0 | 0 |
| 8% Zinc HEX-CEM® [14] | 1.09 | 0.97 | 0.58 | 0.66 | 0.71 | 0.71 |
| CYASORB® L143-50X [15] | 2.81 | 2.32 | 2.34 | 2.53 | | |
| TINUVIN® 123 [16] | 0 | 0 | 0 | 0 | 0.95 | 0.94 |
| TINUVIN® 1130 [17] | 0 | 0 | 0 | 0 | 0.47 | 0.47 |
| Acetone | 3.45 | 4.21 | 3.79 | 4.98 | 3 | 2.97 |
| Methyl acetate | 0 | 2.58 | 2.6 | 0 | 0 | 0 |
| Stage 3 | | | | | | |
| Aliphatic polyisocyanate [2] | 28.63 | 14.98 | 15.85 | 17.35 | 27.05 | 26.83 |

[20] Acetoacetate polyester comprising diethylmalonate, t-butyl acetoacetate, trimethylolpropane, and benzoic acid. Mn = 310, Mw = 328.
[21] Acetoacetate acrylic polymer comprising 40 weight % methylmethacrylate, 15 weight % 2-ethylhexylacrylate, and 45 weight % acetoacetoxyethyl methacrylate. Mn = 2093, Mw = 8506.
[22] Acetoacetate-polyol acrylic polymer comprising 45 weight % methylmethacrylate, 15 weight % 2-ethylhexylacrylate, 30 weight % acetoacetoxyethyl methacrylate, and 10 weight % hydroxyethyl acrylate. Mn = 2039, Mw = 10224.
[23] Acetoacetate urethane polymer comprising t-butyl acetoacetate, DESMODUR N3900 (aliphatic polyisocyanate based on hexamethylene diisocyanate), neopentylglycol, methanol, and dibutyltin dilaurate. Mn = 1474, Mw = 3314.
[24] Aminofunctional co-reactant available from Bayer MaterialScience (Leverkusen, Germany).

Each of the coating compositions listed in Tables 3 and 4 was prepared in three stages. In the first stage, the various pigments were dispersed in a mixture comprising a resinous acetoacetate polymer, dispersants, and solvents to give a pre-mill mixture.

The pre-mill mixture was then milled with a Lau 200 Disperser for 120 minutes and demonstrated a Hegman value of greater than 7, as determined by ASTM D1210-05. The mixture was agitated and letdown with the components of Stage 2 to provide a resin composition.

The isocyanate(s) of Stage 3 were then added to the resin composition to provide curable coating compositions having the isocyanate:acetoacetate ratio, viscosity, volume percentage of total solids, and VOC as shown in Table 5.

TABLE 5

| Coating | NCO:ACAC | Viscosity (mixed, cP)* | % Volume Solids | VOC[25] (lbs/gal) |
|---|---|---|---|---|
| Example 2 coating | 1.2 | 51 | 70.44 | 2.1 |
| Example 3 coating | 0.8 | | 68.97 | 2.19 |
| Example 4 coating | 1.2 | 70 | 66.77 | 2.36 |
| Example 5 coating | 1.5 | 64 | 66.77 | 2.36 |
| Example 6 coating | 1.2 | 77 | 63.89 | 2.55 |
| Example 7 coating | 1.2 | 36 | 66.76 | 2.35 |
| Example 8 coating | 1.2 | 66 | 66.78 | 2.36 |
| Example 9 coating | 1.2 | | 66.83 | 2.35 |
| Example 10 coating | 1.2 | | 49.4 | 3.64 |
| Example 11 coating | 1.2 | | 49.73 | 3.63 |
| Example 12 coating | 1.2 | | 51.37 | 3.47 |
| Example 13 coating | 1.2 | | 68.62 | 2.21 |
| Example 14 coating | 1.2 | | 70.09 | 2.11 |

[25] Amount of volatile organic compounds in a coating measured in accordance with ASTM D3960.
*Viscosity measured on a CAP 2000+ viscometer at 25° C. using a #1 sized spindle and shear rate of 750 s$^{-1}$ in accordance with ASTM D2196.

Example 15

Physical Properties Evaluation

Each of the curable coating compositions of Examples 2-14 was sprayed over an iron phosphate pretreated cold rolled steel with a deionized water rinse treatment (panel 1) and an iron phosphate pretreated cold rolled steel with a non-chrome phosphate free rinse treatment (panel 2) at a dry film thickness of about 1.5 mils. The coatings were then allowed to cure at ambient temperature, post-cured for one week at ambient conditions before testing. The physical properties are shown in Tables 6-8.

TABLE 6

| | Coatings | | | | | | | |
|---|---|---|---|---|---|---|---|---|
| | Example 2 | | Example 3 | | Example 4 | | Example 5 | |
| | panel 1 | panel 2 | panel 1 | panel 2 | panel 1 | panel 2 | panel 1 | panel 2 |
| 20° Gloss [26] | 80 | 78 | 83 | 82 | 92 | 93 | 90 | 89 |
| 60° Gloss [26] | 91 | 89 | 92 | 92 | 97 | 97 | 97 | 96 |
| Pencil Hardness [27] | 3H | 3H | 3H | 3H | 3H | 3H | 3H | 3H |
| Konig @ 24 hrs. (sec.) [6] | 68 | N/A | 38 | N/A | 79 | N/A | 76 | N/A |
| Konig @ 1 week (sec.) [6] | 128 | N/A | 102 | N/A | 144 | N/A | 163 | N/A |
| Double MEK Rub [28] | 100 | 100 | 100 | 100 | 100 | 100 | 100 | 100 |
| Crosshatch Adhesion [29] | 4B | 4B | 4B | 4B | 4B | 5B | 4B | 5B |
| 60 in-lb impact (direct) [30] | + | + | + | + | + | + | + | + |
| 90 in-lb impact (direct) [30] | + | + | + | + | + | + | + | + |
| 20 in-lb impact (reverse) [31] | + | + | + | + | + | + | + | + |
| Conical Mandrel Bend [32] | + | + | + | + | + | + | + | + |
| ΔE after 1000 hrs. SAE J2527 Wear of Materials (WOM) | 0.62 | N/A | 0.51 | N/A | 0.53 | N/A | 0.43 | N/A |

[26] Specular gloss measured in accordance with ASTM D523.
[27] Film hardness of a coating tested in accordance with ASTM D3363.
[28] Methyl ethyl ketone (MEK) solvent resistance test performed in accordance with ASTM D4752.
[29] Adhesion of a coating to a substrate measured in accordance with ASTM D3359.
[30] Direct resistance to cracking caused by direct impact measured in accordance with ASTM D2794 (− indicates cracking; + indicates no cracking).
[31] Indirect resistance to cracking caused by reverse impact measured in accordance with ASTM D2794 (− indicates cracking; + indicates no cracking).
[32] Flexibility of an attached coating and its resistance to cracking when elongated, measured in accordance with ASTM D522 (− indicates cracking; + indicates no cracking).

TABLE 7

| | Coatings | | | | | | | |
|---|---|---|---|---|---|---|---|---|
| | Example 6 | | Example 7 | | Example 8 | | Example 9 | |
| | panel 1 | panel 2 | panel 1 | panel 2 | panel 1 | panel 2 | panel 1 | panel 2 |
| 20° Gloss [26] | 91 | 91 | 89 | 88 | 91 | 93 | 92 | 94 |
| 60° Gloss [26] | 97 | 97 | 95 | 94 | 97 | 97 | 97 | 98 |
| Pencil Hardness [27] | 2H | 3H | 2H | 2H | 3H | 3H | 3H | 2H |
| Konig @ 24 hrs. (sec.) [6] | 65 | N/A | 26 | N/A | 69 | N/A | 38 | N/A |
| Konig @ 1 week (sec.) [6] | 132 | N/A | 58 | N/A | 115 | N/A | 82 | N/A |
| Double MEK Rub [28] | 100-Fail | 100 | 100 | 100 | 100 | 100 | 100 | 100 |
| Crosshatch Adhesion [29] | 4B | 5B | 4B | 4B | 4B | 4B | 4B | 4B |
| 60 in-lb impact (direct) [30] | − | − | + | + | + | + | − | − |
| 90 in-lb impact (direct) [30] | − | − | + | + | + | + | + | + |
| 20 in-lb impact (reverse) [31] | − | − | + | + | + | + | − | − |
| Conical Mandrel Bend [32] | − | − | + | + | + | + | + | + |
| ΔE after 1000 hrs. SAE J2527 Wear of Materials (WOM) | 0.61 | N/A | 0.74 | N/A | N/A | N/A | N/A | N/A |

TABLE 8

| | Coatings | | | | | | | | |
|---|---|---|---|---|---|---|---|---|---|
| | Example 10 | | Example 11 | | Example 12 | | Example 13 | | Example 14 |
| | panel 1 | panel 2 | panel 1 | panel 2 | panel 1 | panel 1 | panel 1 | panel 2 | panel 1 | panel 2 |

| | panel 1 | panel 2 | panel 1 | panel 2 | panel 1 | panel 2 | panel 1 | panel 2 | panel 1 | panel 2 |
|---|---|---|---|---|---|---|---|---|---|---|
| 20° Gloss [26] | 82 | 81 | 78 | 79 | 86 | 85 | 77 | 80 | 85 | 79 |
| 60° Gloss [26] | 91 | 90 | 88 | 90 | 94 | 93 | 84 | 89 | 93 | 90 |
| Pencil Hardness [27] | 3H | 3H | 3H | 3H | 3H | 3H | 3H | 3H | 3H | 3H |
| Konig @ 24 hrs. (sec.) [6] | 43 | N/A | 56 | N/A | 62 | 76 | 29 | N/A | 76 | N/A |
| Konig @ 1 week (sec.) [6] | 93 | N/A | 113 | N/A | 114 | 89 | 62 | N/A | 89 | N/A |
| Double MEK Rub [28] | 100 | 100 | 100 | 100 | 100 | 100 | 100 | 100 | 100 | 100 |
| Crosshatch Adhesion [29] | 4B | 4B | 4B | 4B | 4B | 4B | 4B | 5B | 4B | 4B |
| 60 in-lb impact (direct) [30] | + | + | + | + | + | + | + | + | + | + |
| 90 in-lb impact (direct) [30] | + | + | + | + | + | + | + | + | + | + |
| 20 in-lb impact (reverse) [31] | − | + | + | + | + | + | + | + | + | + |
| Conical Mandrel Bend [32] | + | + | + | + | + | + | + | + | + | + |

TABLE 8-continued

| | Coatings | | | | | | | | | |
|---|---|---|---|---|---|---|---|---|---|---|
| | Example 10 | | Example 11 | | Example 12 | | Example 13 | | Example 14 | |
| | panel 1 | panel 2 | panel 1 | panel 2 | panel 1 | panel 2 | panel 1 | panel 2 | panel 1 | panel 2 |
| ΔE after 1000 hrs. SAE J2527 Wear of Materials (WOM) | 0.41 | N/A | 0.29 | N/A | N/A | N/A | 0.40 | N/A | 0.37 | N/A |

Example 16

Preparation and Evaluation of a Multi-Layer Coating Based on Primer Coating Composition A primer coating composition for application in a multi-layer coating was prepared from the components listed in Table 9.

TABLE 9

| Component | Example 16 (grams) |
|---|---|
| M-P-A ® 2000 T[33] | 0.98 |
| BENTONE ® SD-2[34] | 0.21 |
| SILQUEST ® A-187[35] | 1.10 |
| DISPERBYK ® 110[9] | 0.71 |
| BARTEX ® OWT[36] | 7.00 |
| LO-VEL ™ 27[37] | 0.07 |
| TALCRON ® MP 15-38[38] | 13.32 |
| HB-10BLK[39] | 0.25 |
| HP-74-3333[40] | 1.69 |
| SARTOMER ® 349[41] | 1.07 |
| HEUCOPHOS ® ZP-10[11] | 11.22 |
| TIPURE ™ R-960-38[42] | 6.24 |
| EPON ™ 1001 B80[43] | 2.96 |
| Acetone | 3.59 |
| Methyl amyl ketone | 1.94 |
| Butyl acetate | 12.42 |
| Methyl isobutyl ketone | 7.12 |
| Acetoacetate polyester resin[1] | 10.35 |
| 8% Zinc HEX-CEM ®[14] | 0.22 |
| Acrylic microgel[44] | 4.34 |
| TOLONATE ™ HDT-LV2[45] | 13.22 |

[33]Antisettling agent available from Elementis Specialties, Inc. (East Windsor, NJ).
[34]Clay available from Elementis Specialties, Inc. (East Windsor, NJ).
[35]Siloxane additive available from Momentive Performance Materials (Strongsville, OH).
[36]Barium sulfate extender pigment available from Tor Specialties Minerals (Corpus Christi, TX).
[37]Silica available from PPG Industries, Inc. (Cleveland, OH).
[38]Magnesium silicate hydrate available from Minerals Technologies Inc. (New York, NY).
[39]Black tint available from PPG Industries, Inc. (Cleveland, OH).
[40]Acrylic polyol available from PPG Industries, Inc. (Cleveland, OH).
[41]Ethoxylated bisphenol A diacrylate available from Sartomer Americas (Exton, PA).
[42]Titanium dioxide available from The Chemours Company (Wilmington, DE).
[43]Epoxy resin available from Hexion Inc. (Columbus, OH).
[44]Non-aqueous dispersion prepared according to U.S. Pat. No. 4,540,740.
[45]Aliphatic polyisocyanate available from Vencorex (Saint-Priest, France).

The primer coating composition was prepared by dispersing and milling all components except the isocyanate crosslinker with a Lau 200 Disperser for 180 minutes and demonstrated a Hegman value of greater than 6, as determined by ASTM D1210-05.

TOLONATE™ HDT-LV2 was added with mixing, and the mixture was sprayed over an iron phosphate pretreated cold rolled steel with a deionized water rinse treatment (panel 1) and an iron phosphate pretreated cold rolled steel with a non-chrome phosphate free rinse treatment (panel 2) at a dry film thickness of about 1.5 mils. After an appropriate flash time, a two-component urethane/isocyanate (SPEC-TRACRON®, a 2K topcoat available from PPG Industries Inc. (Cleveland, Ohio)) topcoat was applied over each coating at a dry film thickness of about 2.2 mils. The multi-layered coating system was subjected to a 10 minute flash time, cured at 180° F. for 30 minutes, and then post-cured for one week at ambient conditions before testing. Various properties of the multi-layer coating were evaluated. These properties are shown in Table 10.

TABLE 10

| Substrate | Panel 1 | Panel 2 |
|---|---|---|
| Primer/Topcoat System Properties | Panel 1 | Panel 2 |
| 200 Gloss[26] | 83.0 | 82.3 |
| 600 Gloss[26] | 91.4 | 91.2 |
| Pencil Hardness[27] | 3H | 3H |
| MEK Rub[28] | 100+ | 100+ |
| Crosshatch Adhesion[29] | 5B | 5B |
| 60 in-lb. (direct impact)[30] | PASS | PASS |
| 20 in-lb (reverse impact)[31] | FAIL | PASS |
| Conical Mandrel Bend[32] | 0 | 2.05 mm |
| Scribe Creep After Cyclic corrosion testing[46] | 4.05 mm | 4.86 mm |

[46]Average Scribe Rating (40 cycles SAE J2334), as determined by ASTM D6689.

Example 17

Preparation and Evaluation of a Multi-Layer Coating Based on Topcoat Coating Composition A decorative topcoat composition for application in a multi-layer coating was prepared from the components listed in Table 11.

TABLE 11

| Stage | Component | Example 17 (grams) |
|---|---|---|
| 1 | Acetoacetate Polyester Resin[1] | 25.63 |
| | Butyl acetate | 3.18 |
| | Methyl amyl ketone | 2.87 |
| | EASTMAN ™ EEP[47] | 2.23 |
| | EASTMAN ™ C-11 ketone[48] | 0.99 |
| | DISPERBYK ®-110[9] | 1.40 |
| | MAPICO ® Yellow 1050A[49] | 16.81 |
| | TIONA ® 595[10] | 3.99 |
| | MONARCH ® 1300[50] | 0.05 |
| | 1200 EZ Red Iron Oxide[51] | 0.07 |
| 2 | EVERSORB ® 93[52] | 1.4 |
| | EVERSORB ® 74[53] | 0.7 |
| | BYK ®-430[54] | 0.7 |
| | DISPARLON ® NS-5500[55] | 3.5 |
| | Acetone | 3.48 |
| | 8% Zinc HEX-CEM ®[14] | 1.75 |
| | Acrylic microgel[56] | 1.4 |
| | VERSAFLOW ® Base[57] | 0.28 |
| | RESIFLOW ® LH-240[58] | 0.21 |

TABLE 11-continued

| Stage | Component | Example 17 (grams) |
|---|---|---|
|   | BYK ®-3455[13] | 0.14 |
|   | BYK ®-320[59] | 0.07 |
| 3 | DESMODUR ® XP 2840[60] | 29.16 |

[47]Ether-ester solvent available from Eastman Chemical Company (Kingsport, TN).
[48]Mixture of ketone solvents available from Eastman Chemical Company (Kingsport, TN).
[49]Pigment available from Huntsman Corporation (Salt Lake City, UT).
[50]Pigment available from Cabot Corporation (Boston, MA).
[51]Pigment available from Royale Pigments and Chemicals, Inc. (Paramus, NJ).
[52]Light stabilizer available from Everlight Chemical (Taipei, Taiwan).
[53]Light stabilizer available from Everlight Chemical (Taipei, Taiwan).
[54]Dispersing agent available from Altana AG (Wesel, Germany).
[55]Dispersing agent available from King Industries Inc. (Norwalk, CT).
[56]Non-aqueous dispersion prepared according to U.S. Pat. No. 4,540,740.
[57]Polyethylene fluid available from Shamrock Technologies (Newark, NJ).
[58]Polyacrylate flow control agent available from Estron Chemical Inc. (Calvert City, KY).
[59]Silicone leveling additive available from Altana AG (Wesel, Germany).
[60]Aliphatic polyisocyanate based on hexamethylene diisocyanate available from Bayer MaterialScience (Leverkusen, Germany).

The topcoat coating composition was prepared in three stages. In stage 1, the various pigments were dispersed in a mixture comprising the acetoacetate polyester, dispersants, and solvents to give a pre-mill mixture. The mixture was then milled with a Lau 200 Disperser for 180 minutes and demonstrated a Hegman value of greater than 7, as determined by ASTM D1210-05. The mixture was agitated and letdown with the components of Stage 2 to provide a coating composition.

SPECTRACRON® SEP76418, a wet-on-wet epoxy primer available from PPG industries, Inc. (Cleveland, Ohio) was mixed with SPM76400, a hardener available from PPG industries, Inc. (Cleveland, Ohio), and sprayed over iron phosphate pretreated cold rolled steel with a deionized water rinse treatment (panel 1) and an iron phosphate pretreated cold rolled steel with a non-chrome phosphate free rinse treatment (panel 2) at a dry film thickness of about 1.5 mils. After an appropriate flash period, the isocyanate cross-linker, DESMODUR® XP 2840, was added to the resin composition and the mixture was sprayed over the SPECTRACRON® wet-on-wet epoxy primer at approximately 1.5 mils. The multi-layer coating system was subjected to an additional 10 minute flash time, cured at 180° F. for 30 minutes, and then post-cured for one week at ambient conditions before testing.

SPECTRACRON® SEP75953, a wet-on-wet urethane primer available from PPG industries, Inc. (Cleveland, Ohio) was mixed with GXH1080, a hardener available from PPG industries, Inc. (Cleveland, Ohio), and sprayed over iron phosphate pretreated cold rolled steel with a deionized water rinse treatment (panel 1) and an iron phosphate pretreated cold rolled steel with a non-chrome phosphate free rinse treatment (panel 2) at a dry film thickness of about 1.5 mils. After an appropriate flash period, the isocyanate cross-linker, DESMODUR® XP 2840, was added to the resin composition and the mixture was sprayed over the SPECTRACRON® wet-on-wet epoxy primer films. The multi-layer coating system was subjected to an additional 10 minute flash time, cured at 180° F. for 30 minutes, and then post-cured for one week at ambient conditions before testing.

Measurements of 20° and 60° gloss of the resulting multi-layer coating based on epoxy primer SPECTRACRON® SEP76418 and urethane primer SPECTRACRON® SEP75953 are shown in Tables 12 and 13 respectively.

TABLE 12

| Substrate | Panel 1 | Panel 2 |
|---|---|---|
| 20° Gloss | 89.8 | 92.2 |
| 60° Gloss | 96.1 | 96.4 |

TABLE 13

| Substrate | Panel 1 | Panel 2 |
|---|---|---|
| 20° Gloss | 87.5 | 85.3 |
| 60° Gloss | 93.9 | 91.9 |

Example 18

Evaluation of Coatings Prepared Using a Transition Metal Catalyst

TABLE 14

| Component | A | B |
|---|---|---|
| Acetoacetate acrylic polymer[21] | 35.53 | 35.41 |
| White TiO2 tint paste[61] | 35 | 34.89 |
| Butyl acetate | 14.6 | 14.55 |
| 22% zinc octoate | — | 0.34 |
| Aliphatic polyisocyanate[2] | 14.87 | 14.82 |

[61]A white tint paste comprising 69.2% R-960-38 titanium dioxide, 19.25% of an acrylic grind resin, 11.16% methyl amyl ketone and 0.38% Bentone SD-2 clay Coatings A and B were prepared by mixing the acetoacetate acrylic polymer with the white tint paste, butyl acetate and the white tint paste and aliphatic polyisocyanate, as shown in Table 14. Coating B had added zinc octoate catalyst. All coatings were drawn down using a size 60 wound wire bar on 2×2 in. glass slides and the color measured and gloss measured. Color was measured using an X-Rite ci7800 benchtop spetrophotometer and the yellowness (b*) recorded. Coatings A and B were cured before color measurements were taken.

TABLE 15

| Coating | b* | 20° gloss | 60° gloss |
|---|---|---|---|
| A | 0.17 | — | — |
| B | 0.37 | 76 | 92 |

As can be seen from Table 15, the coating with zinc octoate catalyst did not yellow significantly as evident from the low b* value. The difference in b* value between Coating A and Coating B was less than 1.0 (b* value of 0.17 vs. 0.37, respectively).

The present invention further includes the subject matter of the following clauses.

Clause 1: A curable coating composition comprising: (a) a polymer comprising at least two active methylene functional groups; (b) a polyisocyanate crosslinker; and (c) a transition metal catalyst.

Clause 2: The curable coating composition of clause 1, wherein the active methylene functional groups comprise at least one acetoacetate functional group.

Clause 3: The curable coating composition of clause 1 or 2, wherein the polymer (a) further comprises at least one hydroxyl, carboxyl, epoxy, alkoxysilane, and/or anhydride functional group.

Clause 4: The curable coating composition of any of the preceding clauses, wherein the transition metal catalyst comprises at least one of a zinc complex, a nickel complex, and a cobalt complex.

Clause 5: The curable coating composition of any of the preceding clauses, further comprising a compound (d) different from polymer (a) comprising at least one active methylene functional group.

Clause 6: The curable coating composition of any of the preceding clauses, wherein polymer (a) comprises at least one polyacetoacetate-containing polyacrylate or polyacetoacetate-containing polyester, or both.

Clause 7: The curable coating composition of clause 6, wherein the polymer (a) comprises a polyacetoacetate-containing polyacrylate, wherein the polyacrylate comprises less than 85 weight % of monomers the homopolymers thereof have a glass transition temperature (Tg) of less than −40° C.

Clause 8: The curable coating composition of any of the preceding clauses, wherein the polyisocyanate crosslinker comprises isophorone diisocyanate, 1,6-hexamethylenediisocyanate, isocyanurates, iminooxadiazindiones, biurets, allophanates, uretdiones, dimers, trimers, and/or mixture thereof.

Clause 9: The curable coating composition of any of the preceding clauses, wherein when the coating composition is applied to a substrate as a coating and cured, the cured coating exhibits a maximum color change of 3 ΔE units after 1,000 hours of SAE J2527 durability testing.

Clause 10: The curable coating composition of any of the preceding clauses, wherein, when the coating composition is applied to a substrate as a coating and cured, the difference in b* between the cured coating and the coating composition without transition metal catalyst is less than 1.

Clause 11: A substrate at least partially coated with a coating deposited from the curable coating composition of any of clauses 1-10.

Clause 12: A multi-layer coating comprising: (a) a first coating layer prepared from a curable coating composition according to any of clauses 1-10; and (b) a second coating layer, the second coating layer prepared from a coating composition that is different from (a) and which comprises a second film-forming resin.

Clause 13: A method for preparing a coating comprising: (i) applying the curable coating composition of any of clauses 1-10 onto at least a portion of a substrate; and (ii) curing the curable coating composition at least 20° C. for less than 4 hours to form a coating on the substrate.

Clause 14: The method of clause 13, wherein the substrate is metal.

Clause 15: The method of clause 14, wherein the metal is a pretreated metal.

Whereas particular embodiments of this invention have been described above for purposes of illustration, it will be evident to those skilled in the art that numerous variations of the details of the present invention may be made without departing from the invention as defined in the appended claims.

The invention claimed is:

1. A curable coating composition that upon curing forms a reaction product of an addition reaction between: (a) a polymer comprising at least two active methylene functional groups, wherein the at least two active methylene functional groups comprise at least one acetoacetate functional group, and an active methylene functional group equivalent weight of the polymer is from 150 to 1,000, and (b) a polyisocyanate crosslinker, wherein the addition reaction occurs between the polyisocyanate crosslinker (b) and an active methylene functional group of the polymer (a) and is catalyzed by (c) a catalyst comprising a zinc complex, wherein an amount of the polymer (a) comprises from 10 to 60 wt %, an amount of the polyisocyanate crosslinker (b) comprises from 1 to 60 wt %, and an amount of the catalyst (c) comprising the zinc complex comprises from greater than 0 to 3 wt % based on a total weight of reactants used to form the reaction product.

2. The curable coating composition of claim 1, wherein the polymer (a) further comprises at least one hydroxyl, carboxyl, epoxy, alkoxysilane, and/or anhydride functional group.

3. The curable coating composition of claim 1, further comprising a compound (d) that is different from polymer (a) and comprises at least one active methylene functional group.

4. The curable coating composition of claim 1, wherein polymer (a) comprises at least one polyacetoacetate-containing polyacrylate or polyacetoacetate-containing polyester, or both.

5. The curable coating composition of claim 4, wherein the polymer (a) comprises a polyacetoacetate-containing polyacrylate, wherein the polyacrylate comprises less than 85 weight % of monomers the homopolymers thereof have a glass transition temperature (Tg) of less than −40° C.

6. The curable coating composition of claim 1, wherein the polyisocyanate crosslinker comprises isophorone diisocyanate, 1,6-hexamethylenediisocyanate, isocyanurates, iminooxadiazindiones, biurets, allophanates, uretdiones, dimers, trimers, and/or mixture thereof.

7. The curable coating composition of claim 1, wherein a ratio of isocyanate functional groups to active methylene functional groups is within a range of from 2.5:1 to 0.5:1.

8. The curable coating composition of claim 1, wherein the amount of the polymer (a) comprises from 30-60 wt %; the amount of the polyisocyanate crosslinker comprises from 31-60 wt %; and an amount of the catalyst (c) comprising the zinc complex comprises from greater than 0 to 3 wt %, based on the total weight of reactants used to form the reaction product.

9. A substrate at least partially coated with a coating formed from a curable coating composition that upon curing forms a reaction product of an addition reaction between: (a) a polymer comprising at least two active methylene functional groups, wherein the at least two active methylene functional groups comprise at least one acetoacetate functional group, and an active methylene functional group equivalent weight of the polymer is from 150 to 1,000, and (b) a polyisocyanate crosslinker, wherein the addition reaction occurs between the polyisocyanate crosslinker (b) and an active methylene functional group of the polymer (a) and is catalyzed by (c) a catalyst comprising a zinc complex, wherein an amount of the polymer (a) comprises from 10 to 60 wt %, an amount of the polyisocyanate crosslinker (b) comprises from 1 to 60 wt % and an amount of the catalyst (c) comprising the zinc complex comprises from greater than 0 to 3 wt %, based on a total weight of reactants used to form the reaction product;
   wherein the coating formed from the curable coating composition forms a monocoat; and
   wherein the curable coating composition further comprises a pigment.

10. A multi-layer coating comprising: a topcoat coating layer formed from a curable coating composition that upon curing forms a reaction product of an addition reaction between: (a) a polymer comprising at least two active methylene functional groups, wherein the at least two active methylene functional groups comprise at least one acetoacetate functional group, and an active methylene functional group equivalent weight of the polymer is from 150 to 1,000, and (b) a polyisocyanate crosslinker, wherein the addition reaction occurs between the polyisocyanate crosslinker (b) and an active methylene functional group of the polymer (a) and is catalyzed by (c) a catalyst comprising a zinc complex, wherein an amount of the polymer (a) comprises from 10 to 60 wt %, an amount of the polyisocyanate crosslinker (b) comprises from 1 to 60 wt % and an amount of the catalyst (c) comprising the zinc complex comprises from greater than 0 to 3 wt %, based on a total weight of reactants used to form the reaction product; and a second coating layer under the topcoat coating layer, the second coating layer prepared from a coating composition that is different from the curable coating composition of the topcoat coating layer and which comprises a film-forming resin.

11. The multilayer coating of claim 10, wherein the curable coating composition further comprises a pigment.

12. The multilayer coating of claim 10, wherein the film-forming resin of the second coating layer comprises an epoxy or polyurethane resin.

13. The multilayer coating of claim 10, wherein the second coating layer further comprises a pigment, and wherein the topcoat coating layer is a clear coating layer.

14. A method for preparing a coating comprising:
 (i) applying the curable coating composition of claim 1 onto at least a portion of a substrate as a topcoat layer; and
 (ii) curing the curable coating composition at at least 20° C. for less than 4 hours to form a coating on the substrate.

15. The method of claim 14, wherein the substrate is metal.

16. The method of claim 15, wherein the metal is a pretreated metal.

\* \* \* \* \*